(12) United States Patent
Yumita

(10) Patent No.: US 6,853,100 B2
(45) Date of Patent: Feb. 8, 2005

(54) LINEAR ACTUATOR AND A PUMP APPARATUS AND COMPRESSOR APPARATUS USING SAME

(75) Inventor: Yukinobu Yumita, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 37 days.

(21) Appl. No.: 10/618,837

(22) Filed: Jul. 14, 2003

(65) Prior Publication Data

US 2004/0061583 A1 Apr. 1, 2004

(30) Foreign Application Priority Data

Jul. 16, 2002 (JP) ......................................... 2002-207093

(51) Int. Cl.[7] .......................... H02K 33/16; F04B 17/04
(52) U.S. Cl. ........................ 310/12; 310/30; 417/417; 335/234
(58) Field of Search ............................... 310/12–14, 15, 310/17, 30

(56) References Cited

U.S. PATENT DOCUMENTS 4,127,835 A * 11/1978 Knutson ..................... 335/266
4,761,960 A * 8/1988 Higham et al. ................... 62/6

* cited by examiner

Primary Examiner—Thanh Lam
Assistant Examiner—Judson H. Jones
(74) Attorney, Agent, or Firm—Hogan & Hartson, LLP

(57) ABSTRACT

A linear actuator includes a first yoke part, a second yoke part opposing the first yoke part from a direction perpendicular to the axial direction thereof, an intermediate yoke part forming a first gap and a second gap, a coil disposed within a space delineated by the intermediate yoke part and the second yoke part, which forms a magnetic field between the first yoke part and the intermediate yoke part. The orientation this magnetic field is opposite between the first gap and the second gap, and orientation thereof alternates. The actuator further includes a magnet at one axial-direction end relative to the coil, which generates a fixed magnetic field in the two gaps, directed either from the intermediate yoke part toward the first yoke part or from the first yoke part toward the intermediate yoke part, and an armature disposed that is movable in the axial direction in the first gap and the second gap.

23 Claims, 6 Drawing Sheets

[FIG. 1]
(A)
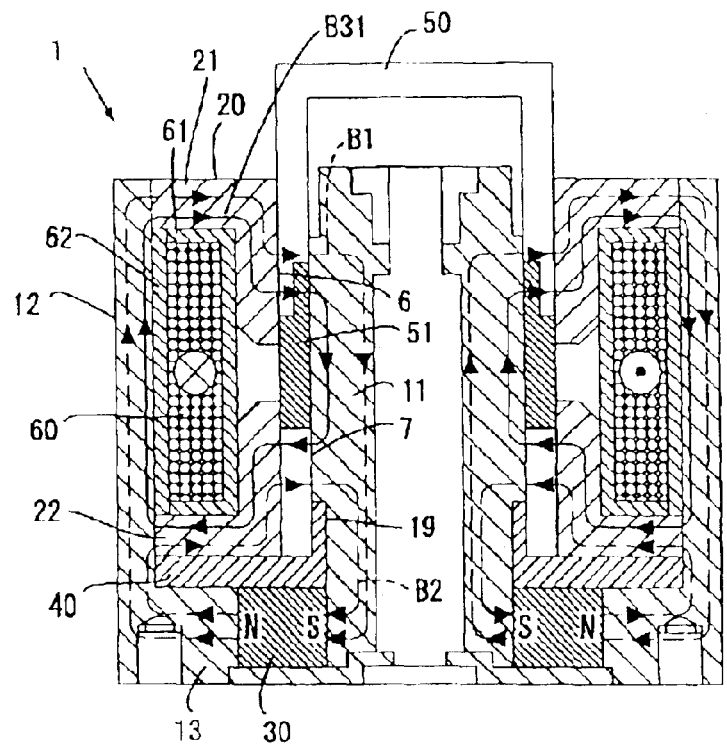
(B)
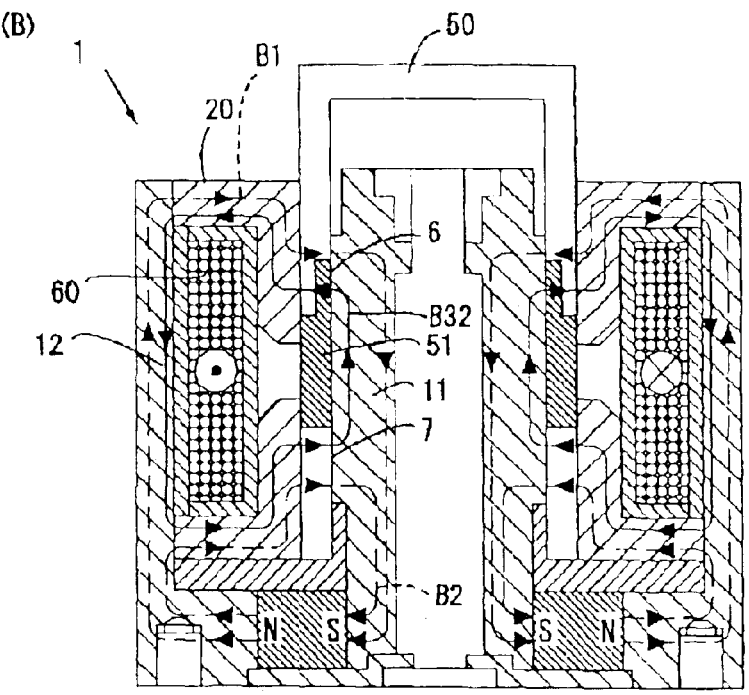

[FIG. 2]
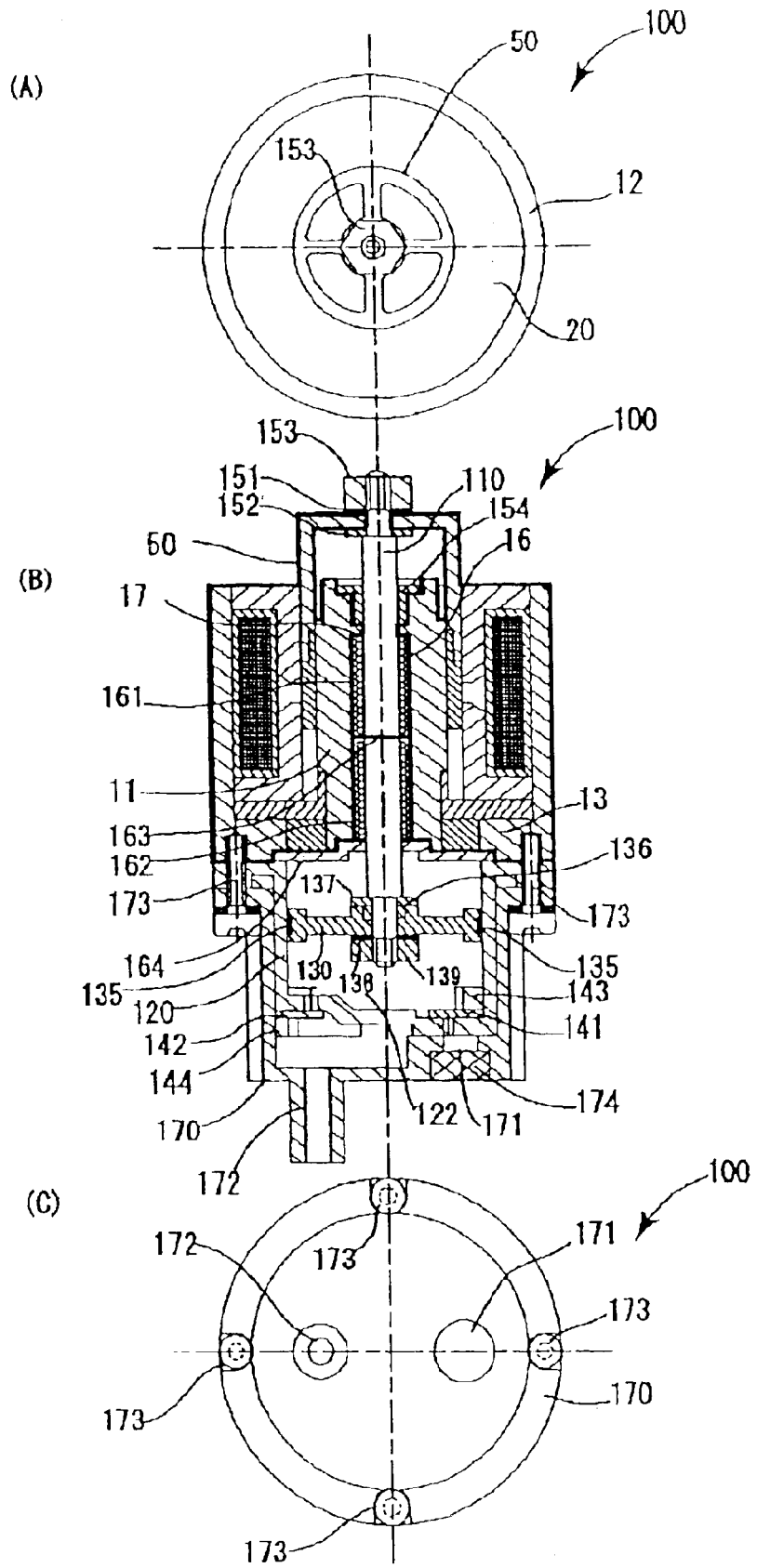

[FIG. 3]
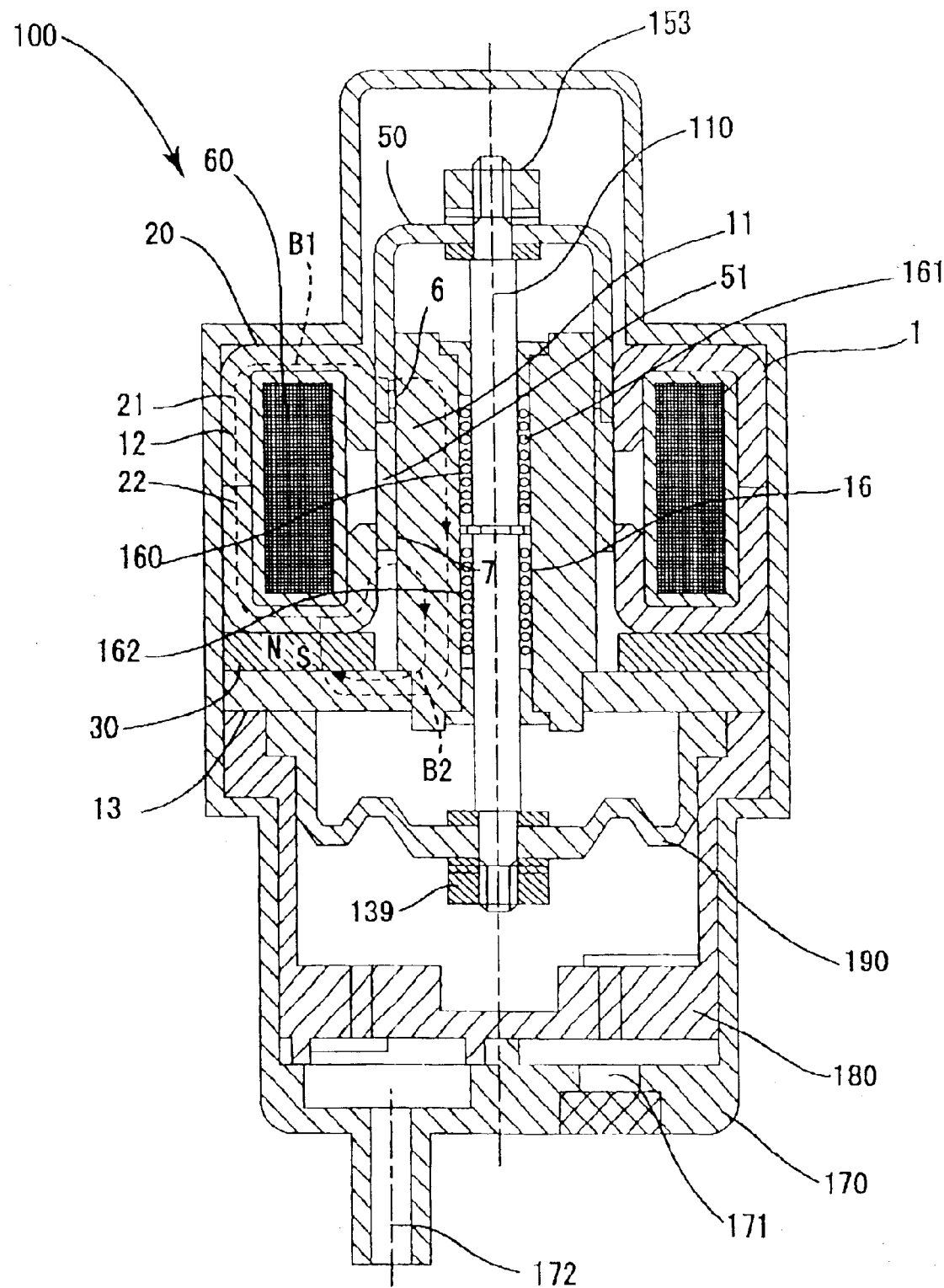

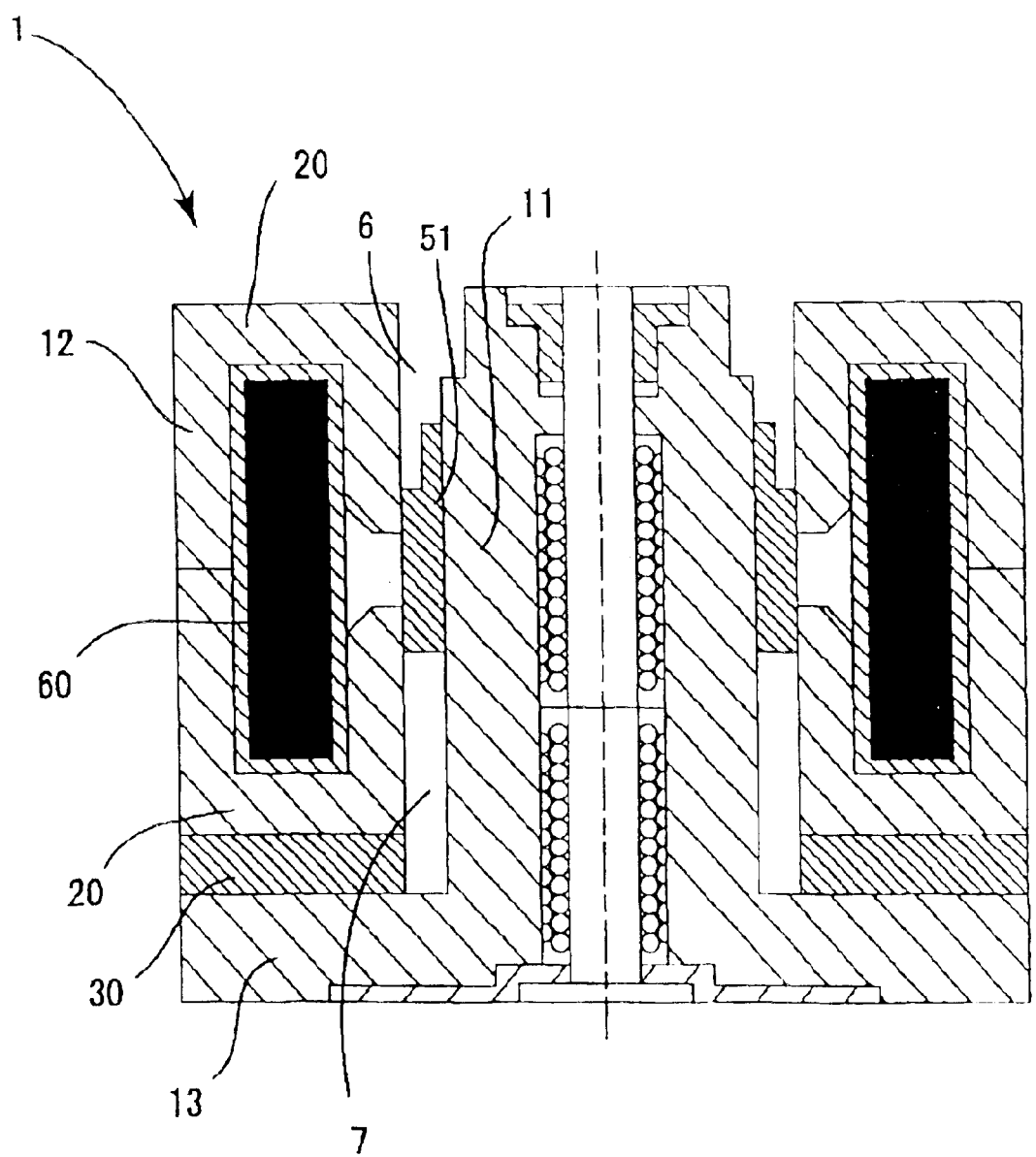
[FIG. 4]

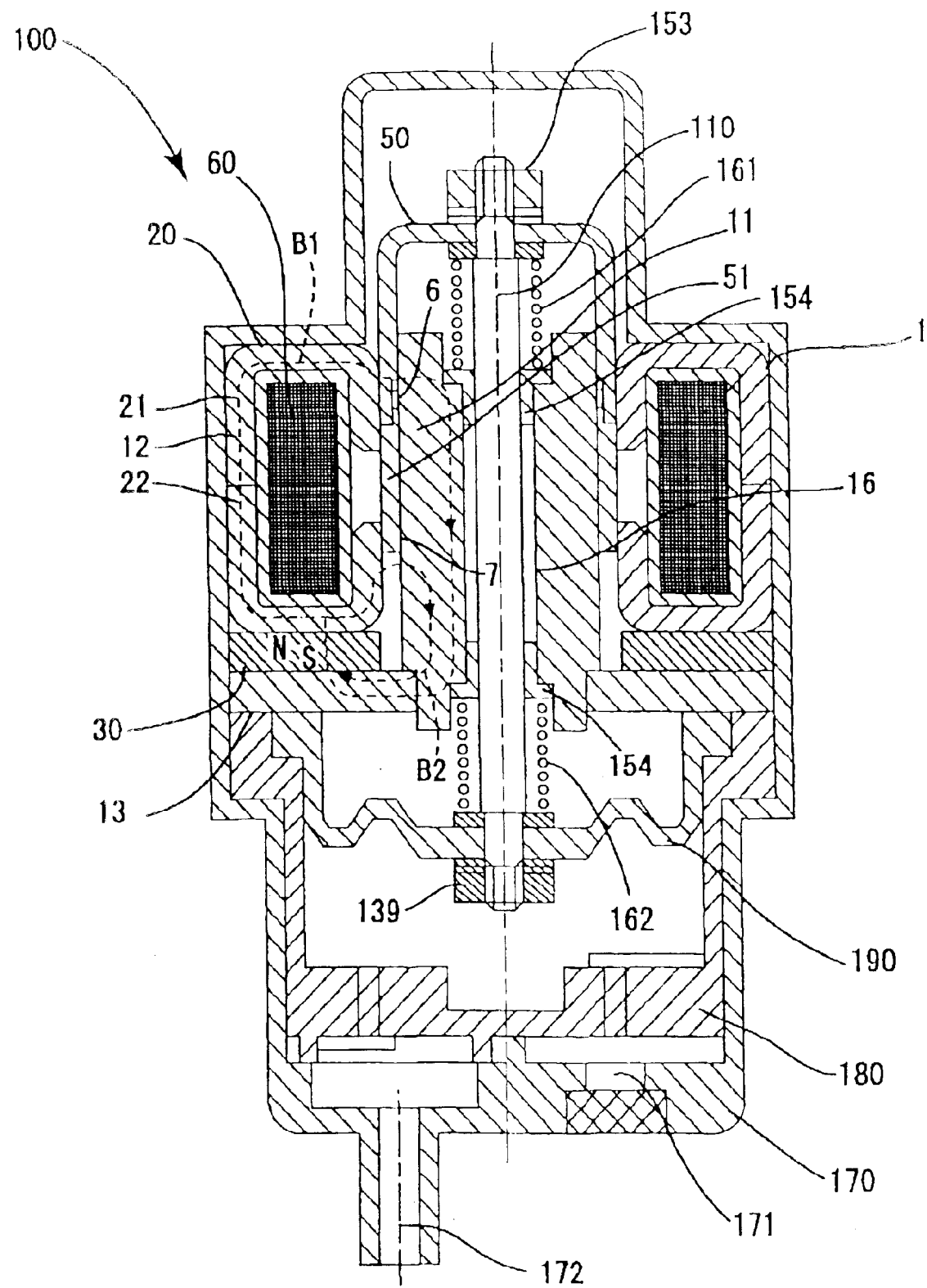
[FIG. 5]

[FIG. 6]
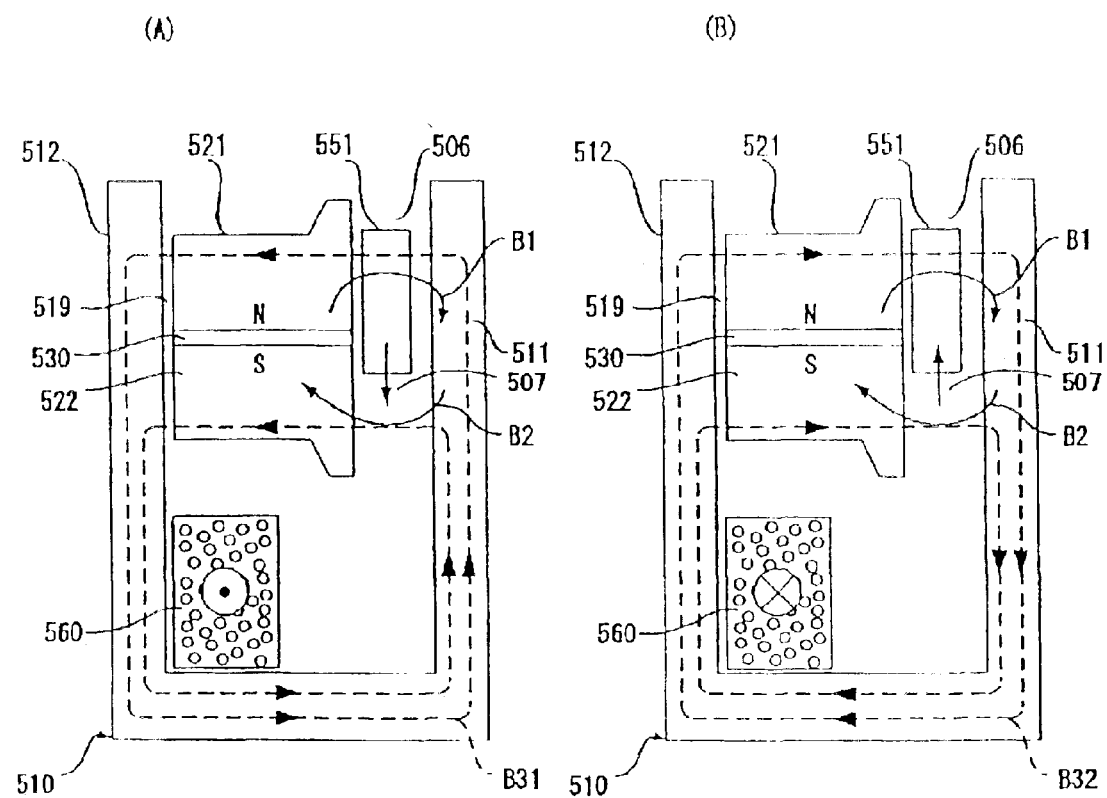

LINEAR ACTUATOR AND A PUMP APPARATUS AND COMPRESSOR APPARATUS USING SAME

BACKGROUND OF THE INVENTION

1. Field of the Invention

The invention relates to a linear actuator, and to a pump apparatus and compressor apparatus using a linear actuator.

2. Related Background Art

In the past, because even in cases of a pump or compressor in which a piston moves linearly within a cylinder, an actuator used therein made use of a motor with a rotational movement output, a crankshaft being provided between the output shaft of the motor and the piston rotational movement to linear movement, there existed the problem of low power transmission efficiency.

The inventor of the present invention considered a new type of linear actuator having, as shown in FIG. 6(A) of the accompanying drawings, a yoke structure 510 having a first yoke part 511 and a second yoke part 512 opposing the first yoke part 511 from a direction perpendicular to the axial direction thereof, a coil 560 generating an alternating magnetic field in the yoke structure 510, a magnet 530 disposed between the first yoke part 511 and the second yoke part 512, in which north and south poles are formed along the axial direction, intermediate yoke parts 521 and 522 disposed between the first yoke part 511 and the second yoke part 512 so as to surround the magnet 530 from both sides in the axial direction and so as to form a first gap 506 and a second gap 507 between itself and the first yoke part 511 and second yoke part 512, and a magnetic body 551 disposed so as to be movable in the axial direction relative to the gaps 506 and 507. In this arrangement, a gap 519 is provided between the second yoke part 512 and the intermediate yoke parts 521 and 522, so that a magnetic field is formed as indicated by either the arrow B31 or the arrow B32 in FIG. 6(A) and FIG. 6(B) respectively, as will be described below.

In an actuator as described above, a magnetic field is generated as shown by the solid-line arrows B1 and B2 in FIG. 6(A). In this condition, when an alternating current is caused to flow in the coil 560, during a period of time in which a current flows in the coil 560 in a direction from the drawing outward toward the viewer, a magnetic field indicated by the broken-line arrow B31 is generated and, of the gaps 506 and 507, whereas in the gap 506 at the first intermediate yoke part 521 side the orientations of the magnetic field from the magnet 530 and the magnetic lines of force from the coil 560 are mutually opposite, in the gap 507 at the second intermediate yoke part 522 side the orientations of the magnetic field from the magnet 530 and the magnetic lines of force from the coil 560 coincide, thereby resulting in a downward directed force acting on the magnetic body 551.

In contrast to the above, as shown in FIG. 6(B), during a period of time when a current flows in the coil 560 in the direction into the paper when viewing the drawing, a magnetic field indicated by the broken-line arrow B32 and is generated and whereas in the gap 506 at the first intermediate yoke 521 side, in which there is coincidence between the orientations of the magnetic field from the magnet 530 and the magnetic lines of force from the coil 560, in the gap 507 at the intermediate yoke 522 side, the orientations of the magnetic field from the magnet 530 and the magnetic lines of force from the coil 560 are mutually opposing, thereby resulting in an upwardly directed force acting on the magnetic body 551.

Because the orientation of the force applied in the axial direction to the magnetic body 551 alternates each time the polarity of the current flowing in the coil 560 reverses, an armature (not shown in the drawing) formed as one with the magnetic body 551 vibrates in the axial direction, making it possible to output reciprocating linear motion.

In a linear actuator as described above with reference to FIG. 6(A) and FIG. 6(B), however, because the formation of a magnetic field indicated by the arrow B31 or the arrow B32 necessitates the provision of a gap 519 between the second yoke part 512 and the first and second intermediate yoke parts 521 and 522, a considerable portion of the magnetomotive force obtained by the coil 560 is consumed in the gap 519, this contributing to a reduction in the magnetic efficiency and resulting in a small output. This has prevented practical application, and there remains a need for further improvement.

Accordingly, the present invention seeks to provide a linear actuator with a further improvement in output characteristics, in addition to a pump apparatus and a compressor apparatus using such a linear actuator.

SUMMARY OF THE INVENTION

In order to achieve the above-noted improvement in output characteristics, the present invention has a first yoke part, a second yoke part opposing the first yoke part from a direction perpendicular to the axial direction thereof, an intermediate yoke part forming a first gap and a second gap, which provides a distance from the second yoke part side in the axial direction, passes both sides, and provides a distance relative to the first yoke part, a coil disposed within a space delineated by the intermediate yoke part and the second yoke part, which forms a magnetic field between the first yoke part and the intermediate yoke part, the orientation of which is opposite between the first gap and the second gap, and which alternates the orientation of the magnetic field, a magnet disposed at one axial-direction end relative to the coil, which generates a fixed magnetic field in the first gap and the second gap, directed either from the intermediate yoke part toward the first yoke part or from the first yoke part toward the intermediate yoke part, and an armature disposed so as to be movable in the axial direction in the first gap and the second gap.

In the present invention, when an alternating current is caused to flow in the coil, an alternating magnetic field is generated in a magnetic path formed by the second yoke part, the intermediate yoke part, the first gap, the second gap, the intermediate yoke part, and the second yoke part surrounding the coil, and the magnetic field of a reverse orientation is generated in the first gap and second gap. The magnet generates a fixed magnetic field in the first gap and second gap, directed either from the first yoke part toward the intermediate yoke part or from the first yoke part toward the intermediate yoke part. For this reason, the magnetic field generated by the coil and the magnetic lines of force generated by the magnet in one of the gaps aid (strengthen) each other, while in the other gap the magnetic field generated by the coil and the magnetic lines of force generated by the magnet buck (weaken) each other. For this reason, the magnetic piece moves in the direction of the bucking of the two above-noted fields, but because an alternating magnetic field is being generated by the coil, the magnetic piece vibrates in the axial direction. In the first yoke part, the intermediate yoke part, and the second yoke part surrounding the coil, there is only form a first gap and a second gap between the first yoke part and the intermediate yoke part, in which the magnetic body is disposed, and there is no need for a gap between the second yoke part and the intermediate yoke part. This being the case, because there is no unnecessary dissipation of the magnetomotive force developed by the coil and the magnetic in a gap, the magnetic efficiency is high. The result of this is that the present invention achieves a high output.

In the present invention, it is preferable that the first yoke part, the first and second gaps, the intermediate yoke part, and the second yoke part be disposed in this sequence from the inside outward, and further that these elements be configured so as to have a circular or substantially polygonal shape when viewed along the axial direction.

In the present invention, it is possible to adopt a configuration in which on the side of the coil at which the magnet is disposed, a bridging yoke part is formed adjacent to one yoke part of the first yoke part and the second yoke part and distanced from the other of the first yoke part and the second yoke part, the magnet being disposed between the bridging yoke part and the other yoke part, having magnetic poles directed toward the yoke that are different. By adopting this configuration, it is easy to magnetically couple the first and second yoke parts.

It is preferable in the present invention that there be a non-magnetic body interposed between the bridging yoke part and the magnet at the intermediate yoke part.

In the present invention, it is possible to adopt a configuration in which on the side of the coil on which the magnet is disposed, a bridging yoke part, which is adjacent to the first yoke part and distanced from the second yoke part is formed, and to dispose the magnet so that the magnetic poles facing the yoke parts are different. By adopting this configuration, it is easy to magnetically couple the first and second yoke parts. Additionally, by adopting this configuration it is the end surface of the magnet in the axial direction that is required to have high precision, and because this surface is planar, it is easy to achieve surface precision by polishing or the like.

In the present invention, it is preferable that the bridging yoke part be formed as one either with the first yoke part to which the bridging yoke part is adjacent or with the second yoke part. By adopting this configuration, it is possible to reduce the number of parts used.

The above-described linear actuator according to the present invention can be used in a pump apparatus supplying various fluids, or in a compressor apparatus.

In a linear actuator according to the present invention as described above, when a current is caused to flow through the coil, an alternating magnetic field is generated in the magnetic path formed by the second yoke part, the intermediate yoke part, the first gap, the first yoke part, the second yoke part, the intermediate yoke part, and second yoke part surrounding the coil, and a magnetic field having the reverse orientation is formed in the first and second gaps. The magnet generates a fixed field in the first and second gaps, either from the intermediate yoke part to the first yoke part or from the first yoke part to the intermediate yoke part. For this reason, the magnetic field generated by the coil and the magnetic field generated by the magnet aid each other in one of the two gaps, and buck each other in the other of the two gaps. The result is that the magnetic piece moves in the direction of the bucking of the two magnetic fields, but because an alternating magnetic field is being generated by the coil, the magnetic piece vibrates in the axial direction. In the first yoke part, the intermediate yoke part, and the second yoke part surrounding the coil there is the first gap and the second gap in which the magnetic body is disposed between the first yoke part and the second yoke part, and it is not necessary to have a gap between the second yoke part and the intermediate yoke part. This eliminates unnecessary dissipation of the magnetomotive force generated by the coil and by the magnet, thereby achieving a high magnetic efficiency and enabling the present invention to achieve a high output.

BRIEF DESCRIPTION OF THE DRAWINGS

FIG. 1(A) and FIG. 1(B) are drawings showing, respectively, the configuration and the operation of a first embodiment of a linear actuator according to the present invention.

FIG. 2(A), FIG. 2(B), and FIG. 2(C) are, respectively, a top plan view, a cross-sectional view, and a bottom plan view of an air pump using the linear actuator shown in FIG. 1.

FIG. 3 is a cross-sectional view showing a linear actuator according to a second embodiment of the present invention, and an air pump apparatus utilizing same.

FIG. 4 is a cross-sectional view of a linear actuator according to a variation on the second embodiment of the present invention.

FIG. 5 is a cross-sectional view of a linear actuator according to a different variation on the second embodiment of the present invention.

FIG. 6(A) and FIG. 6(B) are, respectively, cross-sectional views illustrating a linear actuator presented as a reference example.

PREFERRED EMBODIMENTS

Embodiments of the present invention are described below in detail, with references made to relevant accompanying drawings.

The configuration and operation of the first embodiment of a linear actuator according to the present invention are shown, respectively, in FIG. 1(A) and FIG. 1(B).

FIG. 1(A) shows a linear actuator 1 according to the first embodiment, which is used in a pump apparatus supplying various fluids or in a compressor apparatus.

The linear actuator 1 of this embodiment has a first yoke part 11, a second yoke part 12 opposing the first yoke part 11 from a direction perpendicular to the axis thereof, an intermediate yoke part 20 forming a first gap 6 and a second gap 7 which provides a distance from the second yoke part 12 side in the axial direction, passes both sides, and provides a distance relative to the first yoke part 11, a coil 60 disposed within a space delineated by the intermediate yoke part 20 and the second yoke part 12, a magnet 30 disposed at one axial-direction end relative to the coil 60 (downward side as viewed in FIG. 1(A)), and an armature 50 disposed so as to be movable in the axial direction in the first gap 6 and the second gap 7.

In this embodiment, the first yoke part 11, the first and second gaps 6 and 7, the intermediate yoke part 20, and the second yoke part 12 are disposed in this sequence from the inside toward the outside, and appear to be ring-shaped when viewed in the axial direction. Therefore, the first yoke part 11 forms an annular inner yoke, and the second yoke part 12 forms an annular outer yoke. The coil 60 is wound around a cylindrical bobbin 61, after which a cover 62 is fitted over the outer peripheral surface of the bobbin 61. The first yoke part 11, the first and second gaps 6 and 7, the intermediate yoke part 20, and the second yoke part 12 are disposed in this sequence from the inside toward the outside and are disposed so as to form a shape that is substantially polygonal when viewed from the axial direction.

In this embodiment, the armature 50 is formed as a molded resin object into which a magnetic body 51 is inserted. For this reason, the upper end part of the magnetic body 50 has a hook shape that ensures good filling with resin. It is alternately possible to have the magnetic body 51 formed as one with the armature 50, using a method such as adhesion or the like.

The intermediate yoke part 20 is formed from two magnetic pieces 21 and 22 at the top and bottom, having L-shaped cross-sections, the coil 60 being disposed between these magnetic pieces 21 and 22.

A bridging yoke part 13 extends towards the inside from the lower edge part of the second yoke part 12, this bridging yoke part 13 being at a distance from the first yoke part 11.

A cylindrical magnet 30 is disposed between the inner peripheral surface of the bridging yoke part 13 and the outer peripheral surface of the lower end part of the first yoke part 11, this magnet 30 being magnetized so that it has a south pole at the inner peripheral surface positioned at the first yoke part 11 end and a north pole at the outer peripheral surface facing the bridging yoke part 13. The magnet 30 can alternatively be magnetized so that the inner peripheral surface is the north pole and the outer peripheral surface is the south pole, and in either case a fixed magnetic field is formed in the first gap 6 and the second gap 7 directed either from the intermediate yoke part 20 toward the first yoke part 11, or from the first yoke part 11 directed toward the intermediate yoke part 20.

The bridging yoke part 13 and the magnet 30 can, for example, be of a prescribed thickness dimension or height, so that the upper surfaces of both are included in one and the same plane.

The yoke bridging part 13 and the magnet 30 are disposed so as to be superposed in the axial direction relative to the intermediate yoke part 20, and a spacer 40 made of a non-magnetic material is disposed between the yoke bridging part 13 and the magnet 30 and intermediate yoke part 20. For this reason, the magnetic field formed by the magnet 30 exits the outer peripheral surface thereof, passes through the magnetic path formed by the yoke bridging part 13, the second yoke part 12, the intermediate yoke part 20, the first and second gaps 6 and 7, and the first yoke part 11, and then returns to the inner peripheral surface of the magnet 30, there being no leakage from the magnet 30 into the intermediate yoke part 20.

The spacer 40 is simply fit over a small-diameter part formed at the lower end of the first yoke part 11, this butting against a step 19 formed on the first yoke part 11 so as to automatically position it in the axial direction, thereby forming a space therebelow, in which the magnet 30 and the bridging yoke part 13 are disposed. The spacer 40, therefore, serves the function of facilitating the assembly of the linear actuator 1.

In a linear actuator 1 configured as described above, the magnet 30 generates a magnetic field as indicated by the broken-line arrows B1 and B2 in FIG. 1(A) and FIG. 1(B).

In this condition, when an alternating current is caused to flow through the coil 60, during the period of time in which current flows at the left side of the drawing from the viewer into the drawing, a magnetic field indicated by the solid-line arrow B31 is generated, so that in the first gap 6 the orientations of the magnetic field from the magnet 30 and the magnetic lines of force from the coil 60 coincide, while in the second gap 7 the orientations of the magnetic field from the magnet 30 and the magnetic lines of force from the coil 60 are mutually opposite. The result is that an upward directed force acts upon the magnetic body 51 of the armature 50.

In contrast to the above case, if as shown in FIG. 1(B) the current flowing in the coil 60 flows outward at the left side of the drawing, a magnetic field as indicated by the solid-line arrow B32 is generated, so that in the first gap 6 the orientations of the magnetic field from the magnet 30 an the magnetic lines of force from the coil 60 are mutually opposite, whereas in the second gap 7 the orientations of the magnetic field from the magnet 30 and the magnetic lines of force from the coil 6 coincide. As a result, an upwardly directed force acts upon the magnetic body 51 of the armature 50.

Each time the polarity of the current flowing in the coil 60 reverses, the direction of the force acting upon the magnetic body 51 of the armature 50 is reversed, resulting in axial-direction vibration of the armature 50 which is formed as one with the magnetic body 51, making it possible to output a reciprocating linear movement from a piston or the like mounted to the armature 50.

In a linear actuator 1 according to the first embodiment, in the first yoke part 11, the intermediate yoke part 20, and the second yoke part 12 forming the magnetic path surrounding the coil 60, the only gaps formed are the first gap 6 and the second gap 7 between the first yoke part 11 and the intermediate yoke part 20, in which is disposed the magnetic body 51, and it is not necessary to have a gap between the second yoke part 12 and the intermediate yoke part 20. This being the case, because there is no unnecessary dissipation of the magnetomotive force developed by the coil 60 and the magnet 30 in a gap, the magnetic efficiency is high. The result of this is that the linear actuator 1 of this embodiment can achieve a large output.

As described below, it is possible to apply a linear actuator according to the above-described first embodiment to a pump apparatus and a compressor apparatus, as shown in FIG. 2(A), FIG. 2(B), and FIG. 2(C). While the description to follow is for application to an air pump apparatus, it will be understood that a linear actuator 1 having the same configuration can be applied in the same manner to a compressor apparatus.

FIG. 2(A), FIG. 2(B), and FIG. 2(C) show, respectively, a plan view, a cross-sectional view, and a bottom plan view of an air pump apparatus using the linear actuator 1 shown in FIG. 1, and in FIG. 2(B) the portion of the apparatus corresponding to the linear actuator 1 is surrounding by bold lines.

In FIG. 2(A), FIG. 2(B), and FIG. 2(C), in an air pump apparatus 100 according to this embodiment, the proximal end of an operating shaft 110 is linked to the armature 50 of the linear actuator 1 by a nut 153, via washers 151 and 152, and passes through a hole 16 in the first yoke part 11. The proximal end of the operating shaft 110 is supported by a bearing 154, which is held by the first yoke part 11, and two springs, 161 and 162, are attached around the operating shaft 110. Of the two springs 161 and 162, the spring 161 that is attached to the proximal end of the operating shaft 110 is supported at each end by a step 17 formed on the inside of the hole 16 in the first yoke part 11 and an E-ring 163 attached to the operating shaft 110, the spring 162, which is attached to the distal end of the operating shaft 110, being supported at each end by the E-ring 163 and by a spring retainer 164 fixed to the base part of the yoke structure 10. The intermediate yoke part 13 has attached it to by a bolt 173 a case 170, having an air intake port 171 and an air exhaust port 172, a filter 174 being attached to the air intake port 171. A cylinder case 120 is disposed on the inside of the case 170, a valve 141 being fixed to the base part of the cylinder case 120 at a part opposite the air intake port 171 by a valve holder 143, and a valve 142 being fixed to the base part of the cylinder case 120 at a part opposite the air exhaust port 172 by a valve holder 144.

A piston 130, which forms a cylinder chamber between itself and the cylinder case 120, is disposed within the cylinder case 120, a pressure ring 135 being attached to the outer peripheral surface of the piston, so as to achieve airtightness between the piston and the inner surface of the cylinder case 120.

The distal end part of the operating shaft 110 is fixed to the piston 130 by a nut 139 with intervening washers 147 and 138 and an O-ring 136, the vibration of the operating shaft 110 causing the piston 130 to be driven in the axial direction. Therefore, when the linear actuator 1 causes the operating shaft 110 to move to the proximal side in the axial direction (upward in the drawing), air is sucked into the cylinder chamber from the air intake port 171, and when the linear actuator 1 causes the operating shaft 110 to move to the distal side in the axial direction (downward in the drawing), air in the cylinder chamber 122 is exhausted from the air exhaust port 172. Because the springs 161 and 162 resonate with this vibration of the operating shaft 110, it is possible to achieve superior pumping characteristics even in the case of an air pump apparatus 100 using a compact linear actuator 1.

FIG. 3 is a cross-sectional view showing an air pump apparatus having a linear actuator according to the second embodiment of the present invention. Because the configurations of a linear actuator according to this embodiment and air pump apparatus using this linear actuator are basically the same as the configuration of the first embodiment, descriptions of common parts are omitted, and only the characteristic features of the second embodiment are described herein. While the description to follow is for application to an air pump apparatus using a linear actuator according to the present invention, it will be understood that a linear actuator 1 having the same configuration can be applied in the same manner to a compressor apparatus.

The linear actuator 1 according to the second embodiment, as shown in FIG. 3, has a first yoke part 11, a second yoke part 12 opposing the first yoke part 11 from a direction that perpendicular to the axis thereof, an intermediate yoke part 20 forming a first gap 6 and a second gap 7 which provides a distance from the second yoke part 12 side in the axial direction, passes both sides, and provides a distance relative to the first yoke part 11, a coil 60 disposed within a space delineated by the intermediate yoke part 20 and the second yoke part 12, a magnet 30 disposed at one axial-direction end relative to the coil 60 (downward side as viewed in FIG. 3), and an armature 50 disposed so as to be movable in the axial direction in the first gap 6 and the second gap 7.

In this embodiment as well, the first yoke part 11, the first and second gaps 6 and 7, the intermediate yoke part 20, and the second yoke part 12 are disposed in this sequence from the inside toward the outside, and appear to be ring-shaped when viewed in the axial direction. Therefore, the first yoke part 11 forms an annular inner yoke, and the second yoke part 12 forms an annular outer yoke. The first yoke part 11, the first and second gaps 6 and 7, the intermediate yoke part 20, and the second yoke part 12 are disposed in this sequence from the inside toward the outside and are disposed so as to form a shape that is substantially polygonal when viewed from the axial direction.

In this embodiment, the intermediate yoke part 20 and the second yoke part 12 are formed as one with two magnetic pieces 21 and 22 having U-shaped cross-sections, the coil 60 being disposed between the magnetic pieces 21 and 22. The two magnetic pieces 21 and 22 are fabricated by a pressing operation.

The annular bridging yoke part 13 is pressed into and fixed to a small-diameter part at the lower end of the first yoke part 11, an annular magnet 30 being disposed between the bridging yoke part 13 and the intermediate yoke part 13. The magnet 30 is magnetized, for example, so that the lower end is the south pole and the upper end is the north pole. Therefore, after magnetic lines of force form a fixed magnetic field that, after passing from the intermediate yoke part 20 through the second yoke part 12, passes once again through the intermediate yoke part 20 and then is directed in the first gap 6 from the intermediate yoke part 20 toward the first yoke part 11. After that, the magnetic lines of force pass through the first yoke part 11 and the bridging yoke part 13 and then return to the magnet 30. The magnetic lines of force exiting the upper surface of the magnet 30 form a fixed magnetic field that passes directly from the intermediate yoke part 20 and in the second gap 7 from the intermediate yoke part 20 to the first yoke part 11. The magnetic lines of force then pass through the first yoke part 11 and the bridging yoke part 13 and then return to the lower surface of the magnet 30.

In an actuator according to this embodiment as well, therefore, because the magnet 30 generates a magnetic field as shown by the solid-line arrows B1 and B2 in FIG. 3, in the same manner as in the first embodiment, each time the polarity of the current flowing in the coil 60 reverses, the direction of the force acting upon the magnetic body 51 of the armature 50 is reversed, resulting in axial-direction vibration of the armature 50 which is formed as one with the magnetic body 51, making it possible to output a reciprocating linear movement from a piston or the like mounted to the armature 50.

In a linear actuator 1 according to this embodiment as well, similar to the case of the first embodiment, in the first yoke part 11, the intermediate yoke part 20, and the second yoke part 12 forming the magnetic path surrounding the coil 60, the only gaps formed are the first gap 6 and the second gap 7 between the first yoke part 11 and the intermediate yoke part 20, in which is disposed the magnetic body 51, and it is not necessary to have a gap between the second yoke part 12 and the intermediate yoke part 20. This being the case, because there is no unnecessary dissipation of the magnetomotive force developed by the coil 60 and the magnet 30 in a gap, the magnetic efficiency is high. The result of this is that the linear actuator 1 of this embodiment can achieve a large output.

Additionally, because the intermediate yoke part 20 and the second yoke part 12 are formed as one with the magnetic pieces 21 and 22, it is possible to reduce the number of parts used.

Furthermore, it is the end surface of the magnet in the axial direction that is required to have high precision, and because this surface, unlike the inner peripheral surface or outer peripheral surface, is planar, it is not only easy to achieve surface precision by polishing or the like, but also easy to magnetize the magnet 30.

In an air pump 100 according to this embodiment as well, the proximal end of the operating shaft 110 is linked by a nut to the armature 50 of the linear actuator 1, and passes through a hole 16 in the first yoke part 11.

In this embodiment, the case 170 is formed so as to provide an overall covering, including the linear actuator 1, this case having formed in it a linear actuator air intake port 171 and air exhaust port 172.

Inside the case 170, a diaphragm 190 is held by an inner case 180, the distal end part of the operating shaft 110 being fixed to the diaphragm by a nut 139. For this reason, vibration of the operating shaft 110 causes the driving of the diaphragm 190 in the axial direction, when the linear actuator 1 causes the operating shaft 110 to move to the proximal side in the axial direction (upward in the drawing), air is sucked into the space delineated by the inner case 180 and the diaphragm 190 from the air intake port 171, and when the linear actuator 1 causes the operating shaft 110 to move to the distal side in the axial direction (downward in the drawing), air in the space delineated by the inner case 180 and the diaphragm 190 is exhausted from the air exhaust port 172.

Because the springs 161 and 162 resonate with this vibration of the operating shaft 110, it is possible to achieve superior pumping characteristics even in the case of an air pump apparatus 100 using a compact linear actuator 1.

Other embodiments of the present invention can be envisioned. With regard to the linear actuator 1 according to the second embodiment described with reference to FIG. 3, it is alternatively possible, as shown in FIG. 4, to form the bridging yoke part 13 so that a flange-shaped extension extends from the lower end part of the first yoke part 11, and so that the bridging yoke part 13 is formed as one with the first yoke part 11. If this configuration is adopted, it is possible to reduce the number of parts used, thereby enabling a reduction in cost.

With regard to the air pump apparatus 100 according to the second embodiment described with reference to FIG. 3, it is also possible, as shown in FIG. 5, to dispose the spring 161 between an aperture at the proximal end of the first yoke part 11 and the armature 50, and to dispose the spring 162 between an aperture at the proximal end of the first yoke part 11 and the diaphragm 190. If this configuration is adopted, it is possible to hold the bearing 154 with the springs 161 and 162, and further possible to eliminate the need to form a groove in the operating shaft 110 for the purpose of holding the retaining ring in place (refer to FIG. 2 and FIG. 3), thereby simplifying the configuration.

Although the foregoing examples used the case in which the magnet 30 is a permanent magnetic, it will be understood that the magnet can alternatively be an electromagnet.

Additionally, the first yoke part 11, the second yoke part 12, the intermediate yoke part 20, and the bridging yoke part 13 material can be any of a sintered material, a machined pure iron piece, and a laminate of silicon steel.

What is claimed is:

1. A linear actuator comprising:
   a first yoke part;
   a second yoke part opposing the first yoke part from a direction perpendicular to the axial direction thereof;
   an intermediate yoke part forming a first gap and a second gap, which provides a distance from the second yoke part side in the axial direction, passes both sides, and provides a distance relative to the first yoke part;
   a coil disposed within a space delineated by the intermediate yoke part and the second yoke part, which forms a magnetic field between the first yoke part and the intermediate yoke part, the orientation of which is opposite between the first gap and the second gap, and which alternates the orientation of the magnetic field;
   a magnet disposed at one axial-direction end relative to the coil, which generates a fixed magnetic field in the first gap and the second gap, directed either from the intermediate yoke part toward the first yoke part or from the first yoke part toward the intermediate yoke part; and
   an armature provided with a magnetic body, disposed so as to be movable in the axial direction in the first gap and the second gap.

2. A linear actuator comprising:
   a first yoke part;
   a second yoke part opposing the first yoke part from a direction perpendicular to the axial direction thereof;
   an intermediate yoke part forming a first gap and a second gap, which provides a distance from the second yoke part side in the axial direction, passes both sides, and provides a distance relative to the first yoke part;
   a coil disposed within a space delineated by the intermediate yoke part and the second yoke part, which forms a magnetic field between the first yoke part and the intermediate yoke part, the orientation of which is opposite between the first gap and the second gap, and which alternates the orientation of the magnetic field;
   a magnet disposed at one axial-direction end relative to the coil, which generates a fixed magnetic field in the first gap and the second gap, directed either from the intermediate yoke part toward the first yoke part or from the first yoke part toward the intermediate yoke part; and
   an armature provided with a magnetic body, disposed so as to be movable in the axial direction in the first gap and the second gap;
   wherein the first yoke part, the first gap, the second gap, the intermediate yoke part, and the second yoke part are disposed in this sequence from the inside outward, and are configured so as to have a circular or substantially polygonal shape when viewed from an axial direction.

3. A linear actuator according to claim 2, further comprising a bridging yoke part on a side of the coil at which the magnet is disposed, the bridging yoke part being adjacent to one yoke part of the first yoke part and the second yoke part and being distanced from the other yoke part of the first yoke part and the second yoke part, wherein the magnet is disposed between the bridging yoke part and the other yoke part, with different magnetic poles facing the bridging yoke part and second yoke part.

4. A linear actuator according to claim 3, further comprising a non-magnetic body interposed between the bridging yoke part and magnet and the intermediate yoke part.

5. A linear actuator according to claim 2, further comprising a bridging yoke part on a side of the coil at which the magnet is disposed, the bridging yoke part being adjacent to the first yoke part and being distanced from the second yoke part, wherein the magnet is disposed between the bridging yoke part and the intermediate yoke part with different magnetic poles facing the bridging yoke part and the intermediate yoke part.

6. A linear actuator according to claim 3, wherein the bridging yoke part is formed as one either with the first yoke part, with respect to which it is adjacent, or with the second yoke part.

7. A linear actuator according to claim 4, wherein the bridging yoke part is formed as one either with the first yoke part, with respect to which it is adjacent, or with the second yoke part.

8. A linear actuator according to claim 5, wherein the bridging yoke part is formed as one either with the first yoke part, with respect to which it is adjacent, or with the second yoke part.

9. A linear actuator according to claim 2, wherein the second yoke part is formed as one with the intermediate yoke part.

10. A linear actuator according to claim 3, wherein the second yoke part is formed as one with the intermediate yoke part.

11. A linear actuator according to claim 4, wherein the second yoke part is formed as one with the intermediate yoke part.

12. A linear actuator according to claim 5, wherein the second yoke part is formed as one with the intermediate yoke part.

13. A linear actuator according to claim 6, wherein the second yoke part is formed as one with the intermediate yoke part.

14. A linear actuator according to claim 7, wherein the second yoke part is formed as one with the intermediate yoke part.

15. A linear actuator according to claim 8, wherein the second yoke part is formed as one with the intermediate yoke part.

16. A pump apparatus using a linear actuator according to claim 1.

17. A pump apparatus using a linear actuator according to claim 2.

18. A pump apparatus using a linear actuator according to claim 3.

19. A compressor apparatus using a linear actuator according to claim 1.

20. A compressor apparatus using a linear actuator according to claim 2.

21. A compressor apparatus using a linear actuator according to claim 3.

22. A linear actuator, comprising:

a first yoke means;

a second yoke means opposing the first yoke means from a direction perpendicular to the axial direction thereof;

an intermediate yoke means forming a first gap and a second gap, which provides a distance from the second yoke means side in the axial direction, passes both sides, and provides a distance relative to the first yoke means;

coil means for generating a magnetic field, disposed within a space delineated by the intermediate yoke means and the second yoke means, which forms a magnetic field between the first yoke means and the intermediate yoke means, the orientation of which is opposite between the first gap and the second gap, and which alternates the orientation of the magnetic field;

a magnet means for generating a magnetic field, disposed at one axial-direction end relative to the coil means, which generates a fixed magnetic field in the first gap and the second gap, directed either from the intermediate yoke means toward the first yoke means or from the first yoke means toward the intermediate yoke means; and an armature means provided with a magnetic body means, disposed so as to be movable in the axial direction in the first gap and the second gap.

23. A linear actuator, comprising:

a first yoke means;

a second yoke means opposing the first yoke means from a direction perpendicular to the axial direction thereof;

an intermediate yoke means forming a first gap and a second gap, which provides a distance from the second yoke means side in the axial direction, passes both sides, and provides a distance relative to the first yoke means;

coil means for generating a magnetic field, disposed within a space delineated by the intermediate yoke means and the second yoke means, which forms a magnetic field between the first yoke means and the intermediate yoke means, the orientation of which is opposite between the first gap and the second gap, and which alternates the orientation of the magnetic field;

a magnet means for generating a magnetic field, disposed at one axial-direction end relative to the coil means, which generates a fixed magnetic field in the first gap and the second gap, directed either from the intermediate yoke means toward the first yoke means or from the first yoke means toward the intermediate yoke means; and an armature means provided with a magnetic body means, disposed so as to be movable in the axial direction in the first gap and the second gap, wherein the first yoke means, the first gap, the second gap, the intermediate yoke means, and the second yoke means are disposed in this sequence from the inside outward, and are configured so as to have a circular or substantially polygonal shape when viewed from an axial direction.

* * * * *